United States Patent [19]
Wiers et al.

[11] 3,786,684
[45] Jan. 22, 1974

[54] PIPELINE INSPECTION PIG

[75] Inventors: William C. Wiers, Ann Arbor, Mich.; James R. Sullins; David A. Warren, both of Tulsa, Okla.

[73] Assignee: Automation Industries, Inc., Los Angeles, Calif.

[22] Filed: Dec. 27, 1971

[21] Appl. No.: 211,910

[52] U.S. Cl. .............................. 73/432 R, 324/37
[51] Int. Cl. ............................................. G01r 3/12
[58] Field of Search ....... 73/432, 67.15; 324/37, 40, 324/178, 179, 180

[56] References Cited
UNITED STATES PATENTS

| | | | |
|---|---|---|---|
| 3,593,122 | 7/1971 | Barton et al. | 324/37 |
| 3,438,057 | 4/1969 | Neitzel | 346/107 R |
| 3,483,466 | 12/1969 | Crouch et al. | 324/37 |
| 3,496,457 | 2/1970 | Proctor et al. | 324/37 |
| 3,460,028 | 8/1969 | Beaver et al. | 324/37 |

*Primary Examiner*—S. Clement Swisher
*Attorney, Agent, or Firm*—Dan R. Sadler

[57] ABSTRACT

A self-contained, fully instrumented pipeline inspection pig is disclosed herein. The pig is particularly adapted to be (1) placed in a cross-country or transmission pipeline at a first location such as a pumping station, (2) carried a long distance through the pipeline by the products being pumped therethrough, and (3) eventually retrieved at a second location such as a subsequent pumping station. The pig includes an assortment of instruments for scanning the inside of the pipeline as it is being carried therethrough. These instruments detect various types of discontinuities such as cracks and other defects in the wall of the pipeline. The results of the inspection are stored in an onboard recorder carried by the pig whereby the results can be analyzed after the pig has traversed the pipeline and has been removed therefrom.

17 Claims, 10 Drawing Figures

William C. Wiers,
James R. Sullins,
David A. Warren,
INVENTORS.
BY.

R Sadler
ATTORNEY.

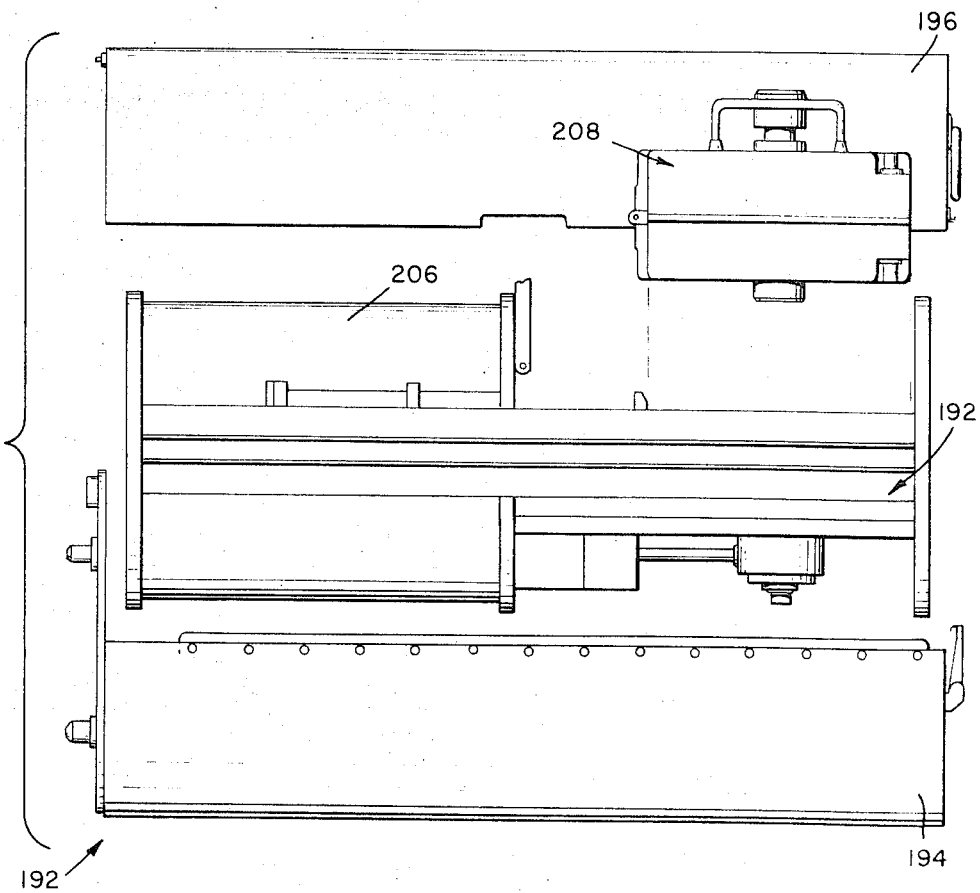
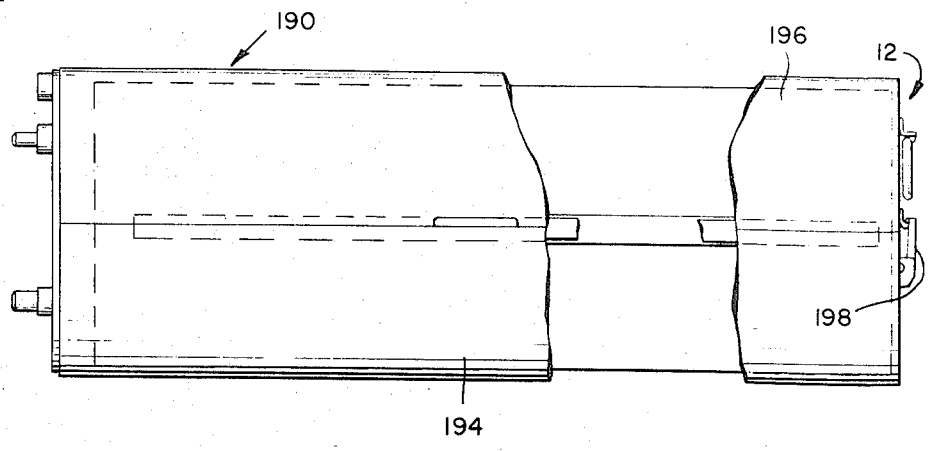
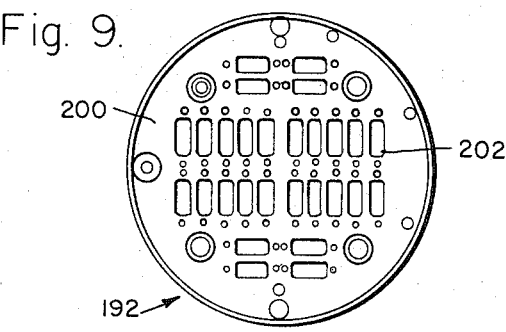
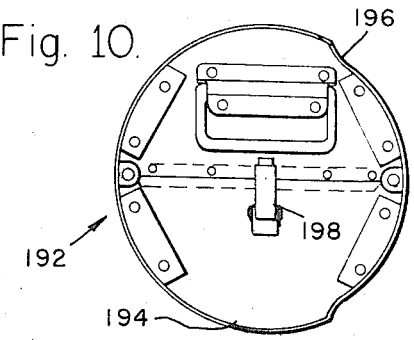

PIPELINE INSPECTION PIG

BACKGROUND

At the present time there are a large number of cross-country pipelines for the transmission of various types of fluid products such as natural gas, crude oil, refined petroleum products, etc. Most of these pipelines are buried beneath the ground and are not readily accessible.

As soon as the transmission line has been built and buried, it begins to deteriorate from various causes. For example, various types of corrosive substances in the fluid may attack the interior of the pipe and cause corrosion. The condition of the soil surrounding the pipeline may be of a corrosive nature whereby the exterior of the pipeline is attacked. Also, if there are any inherent defects in the pipeline such as cracks, etc., the stresses resulting from the high pressures within the pipeline may cause the defects to grow. If the corrosion, cracks, etc., are not detected and repaired at an early date, they may increase until there is a catastrophic failure of the pipeline.

Since the pipelines are buried and inaccessible, it is extremely difficult to inspect the pipeline. In order to inspect the pipeline it has been proposed to provide an inspection instrument or apparatus commonly referred to as a pipeline pig. The pig may be inserted into the pipeline at some accessible location such as a pumping station. The pig is then carried along the pipeline by the fluid traveling therethrough until it is eventually retrieved at a second location such as a second pumping station.

The pig may contain a plurality of pickups which scan the inside surface of the pipeline for various types of defects and a recorder for recording the results of the inspection. It has been found that as a practical matter while the pig is traveling within the pipeline it is operating under very adverse conditions and it must travel over relatively long distances (i.e., 50 to 75 miles). As a consequence, the pigs available heretofore have not been entirely satisfactory, i.e., they have not been capable of accurately and/or reliably detecting the defects. Moreover, when they have detected defects they have frequently failed to identify the type of defect and/or its size and location.

SUMMARY

The present invention provides means for overcoming the foregoing difficulties. More particularly, the present invention provides a fully instrumented, self-contained pipeline pig which is adapted to travel long distances through a pipeline and accurately detect the defects, identify the nature or type of the defect, the size or magnitude of the defect and the locations of the defects along the pipeline.

DRAWINGS

FIG. 7 is a side view of the instrument housing in an OPEN or partially disassembled condition;

FIG. 8 is a side view of the instrument housing in a CLOSED or sealed condition;

FIG. 9 is a front end view of the housing; and

FIG. 10 is a rear end view of the housing.

DETAILED DESCRIPTION

Figure 1:
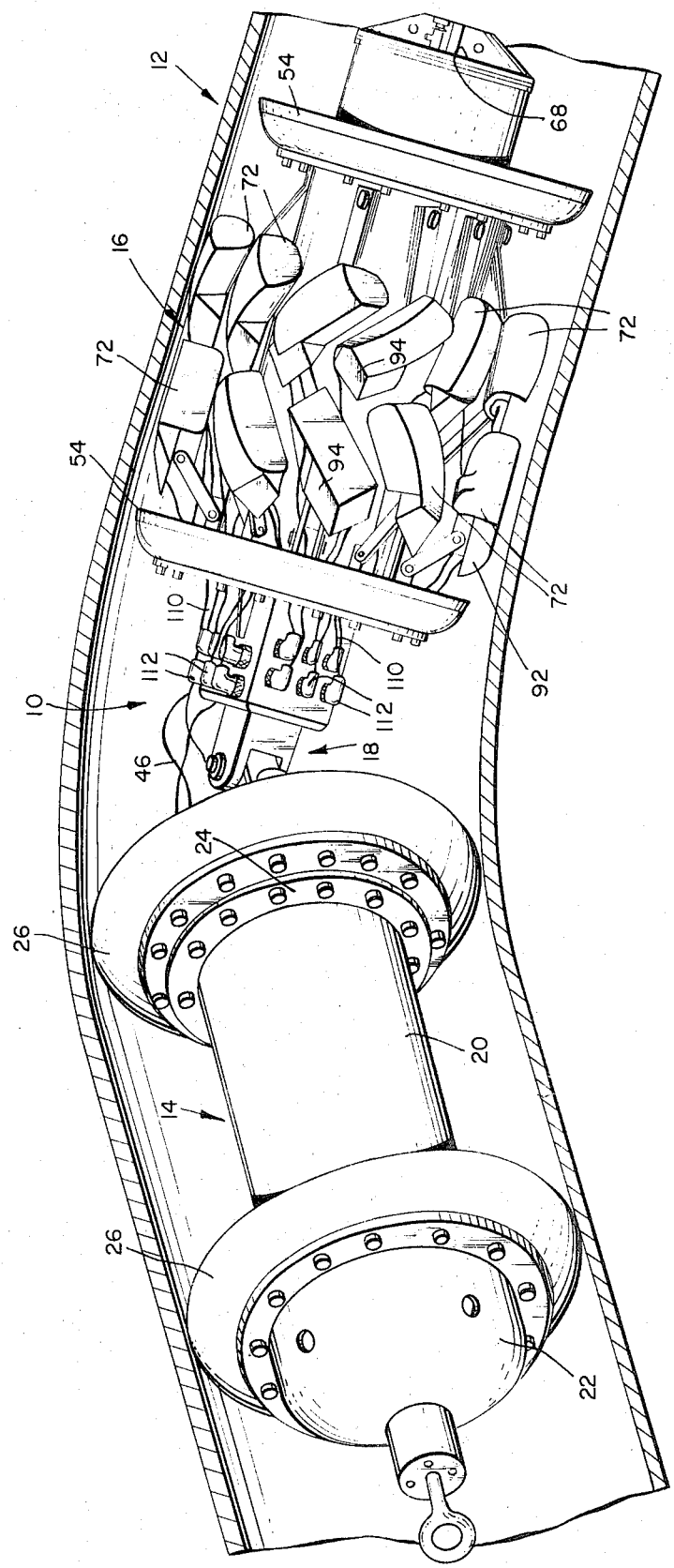
FIG. 1 is a view of a part of a pipeline (a portion thereof being broken away) having a pipeline pig embodying one form of the present invention traveling therethrough.

Referring to the drawings in more detail, the present invention is particularly adapted to be embodied in a so-called pipeline pig 10 for traveling through a cross country transmission pipeline 12. The diameters of the pipelines are usually in a range of approximately 10 inches or less on the smaller side up to 40 or 50 inches or large on the larger side.

However, any given pipeline will usually have a substantially constant diameter over its length or at least for long distance. The pipeline 12 is made by transporting individual sections of pipe to the pipeline right-of-way. The pipe sections are then placed end-to-end and welded together by a circumferential or girth weld.

The individual sections are normally of random length, with the maximum length being on the order of 30 or 40 feet. The minimum length can vary considerably particularly where parts of sections are used to avoid scraping them. As a result, the spacing between the circumferential welds is of an entirely random and unpredictable nature.

After the various individual sections of pipe have been welded together, the resultant pipeline 12 is buried in a trench and covered over with dirt. However, before buring the pipeline it is usually wrapped and/or coated with a protective coating. Frequently the inside of the pipeline 12 is coated. As a result, the pipeline 12 is usually totally inaccessible or at least very hard to get at except at a facility such as a pumping station. The distance from one pumping station to the next varies depending upon the nature of the terrain, etc. However, very frequently it may be 50 or 75 miles from one pumping station to the other.

The pig 10 is adapted to be placed inside the pipeline 12 at one pumping station and forced along the pipeline 12 with the fluid. Eventually, the pig 10 is recovered at the next pumping station.

As the pig 10 is traveling along the pipeline 12, it inspects the pipeline 12 for defects and records the results of the inspection. After the pig 10 is recovered, the record is removed and analyzed.

The present pig 10 is formed in two separate sections 14 and 16 which are joined together by a universal joint 18. This joint allows the two sections 14 and 16 to articulate or bend relative to each other. However, the two sections 14 and 16 are prevented from rotating relative to each other. The lengths of the sections 14 and 16, their shape, etc., are arranged so as to allow the pig 10 going around a 1½ R bend. This is a bend wherein the radius of the bend is one and one-half times the diameter of the pipe.

Figure 2:
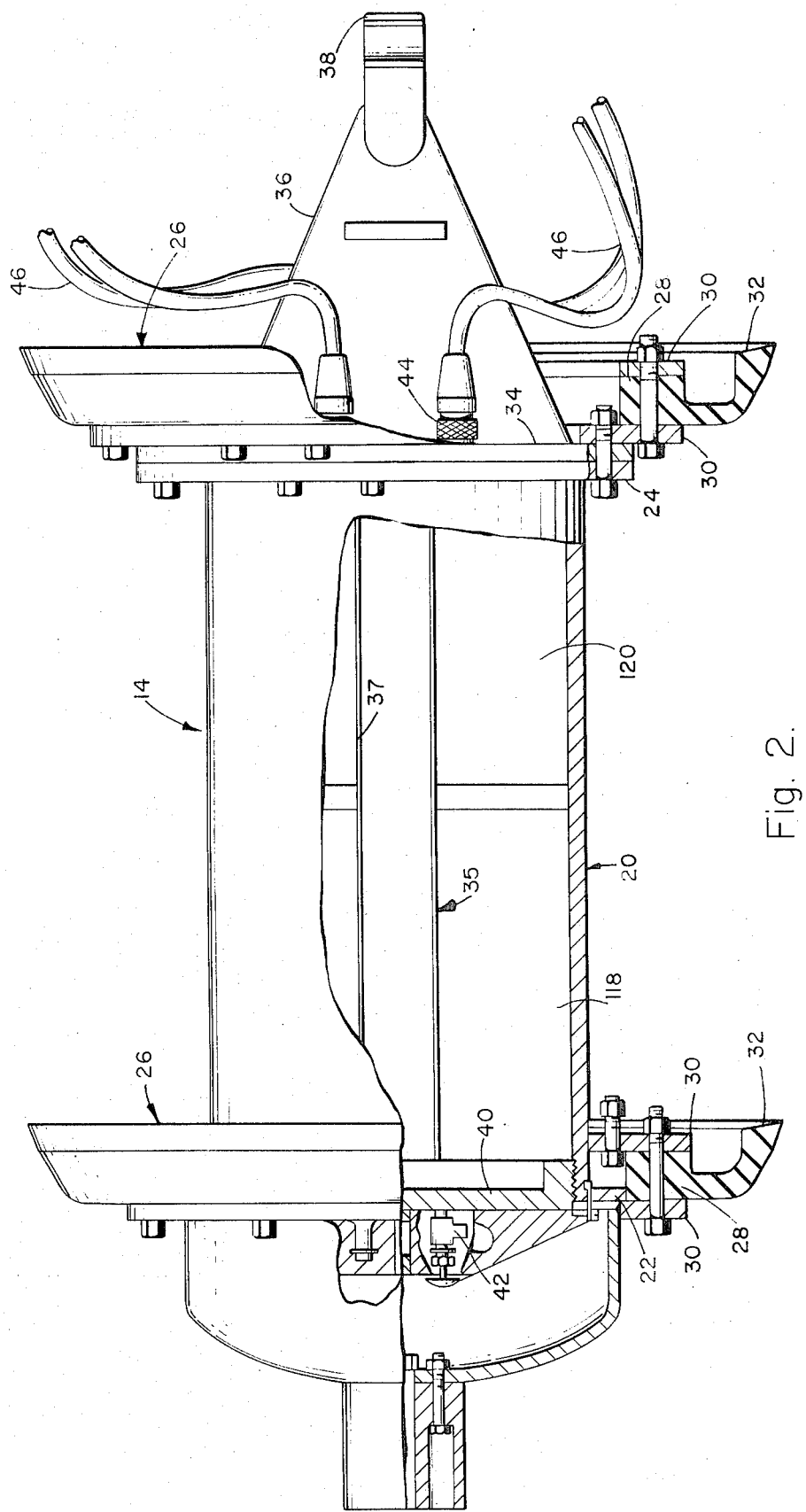
FIG. 2 is a side view of the first or leading section of the pig of FIG. 1, a portion thereof being broken away to show a portion of the inside thereof.

The first or forward section 14 (as best seen in FIG. 2) includes an elongated housing or body 20. The body 20 is preferably very strong with thick steel walls and a substantially cylindrical shape. Mounting means such as radially outwardly directed mounting flanges 22 and 24 are provided on the opposite ends of the body 20.

A packer or seal 26 is secured to each of the flanges 22 and 24. Each of the seals 26 includes an annular hub 28 of increased thickness. One or more steel rings 30 are bolted onto the hub 28 and one of the mounting flanges 22 or 24.

Each seal 26 also includes a wiper or skirt 32 which projects radially outwardly and rearwardly from the hub 28. The exterior of each skirt 32 is designed to fit snugly against the inside surface of the pipeline 12 and form a sliding seal.

Any fluid trying to flow past this section 14 will be blocked by one or both of these packers 26. This will cause the pressure behind the section 14 to build up whereby the pig 10 is forced through the pipeline 12 along with the fluid.

The outside diameter of a pipeline 12 is normally substantially constant. However, when the thickness of the wall varies, the inside diameter of the pipeline varies correspondingly. As a result, the inside diameters of the various individual sections of pipe may vary over a significant range. Sometimes when a pipeline 12 is buried (or even afterwards) it is crushed or bent out of its truly round shape and into an elliptical shape. Moreover, there are frequently irregularities on the surface of the pipe, i.e., welded seams, valves, farm taps, etc.

Accordingly, on the one hand the skirts 32 of the packers 26 should be sufficiently rigid to always expand outwardly and snugly fit against the inside surface of the pipeline 12 at its largest diameter. On the other hand, it should be sufficiently flexible to deflect radially inwardly and pass through the smallest diameter and/or pass over irregularities such as welded seams, etc.

An end plate 34 may be bolted onto the rear mounting flange 24. Usually this plate 34 is at least semipermanently attached. The plate 34 may include an extension 36 which projects rearwardly toward the second section 16. A coupling 38 is mounted on this extension 36 for connecting the two sections together.

A second or forward end plate 40 is attached onto the forward end of body 20. Since it may be desirable to have access into the interior of the body 20, it is desired for this plate 40 to be removable. In the present instance this is accomplished by threading the end plate 40 into the body 20.

These two plates 34 and 40 are effective to seal the body or housing 20 whereby it can withstand the pressures, etc., which may be encountered inside of a pipeline 12. This will insure a controlled environment being maintained inside the housing 20 whereby the contents will not be damaged by the fluid in the pipeline 12. If desired the housing 20 may be filled with air at standard atmospheric pressure. If the inside pressure equals the pressure in the pipeline 12, the stresses on the housing 20 are eliminated. If the internal pressure is higher than the pipeline pressure and if a leak does develop in the pig, any leakage flow would be from the inside out instead of vice versa whereby the fluid in the pipeline 12 will not enter the housing 20. However, it has been found that some parts in the pig (i.e., transistor cases, etc.) will be crushed if the pressure is too high.

In order to control the internal pressure a valve 42 is provided in the end plate 34. Even though the pressure is intended to be atmospheric, as a safety precaution the valve 42 should be opened before opening the housing 20. This will release any pressure that may have built up as a result of a leak.

The forward section 14 normally acts primarily as a power supply. Accordingly, a fuel cell, battery pack, etc., may be disposed inside of the housing 20. In the present instance a frame 35 is provided which has side rails 37 that extend the length of the housing 20. A battery pack 118 is slidably mounted on the side rails 37 whereby it can be freely slipped into and/or out of the housing 20. An inverter 120 is also mounted on the frame 35 for converting the DC power from the battery pack 118 int AC power.

A plurality of terminals and/or connectors 44 are mounted upon the rear plate 34. The inboard ends of these terminals 44 are adapted to mate with the complementary contacts on the frame 37 which in turn are connected to the battery pack 118 and inverter 120. The outboard ends of the contacts are connected to flexible cables 46. The opposite ends of the cables 46 are adapted to extent over to and be connected to the rear section 16 for supplying the DC power and the AC power thereto.

Figure 3:
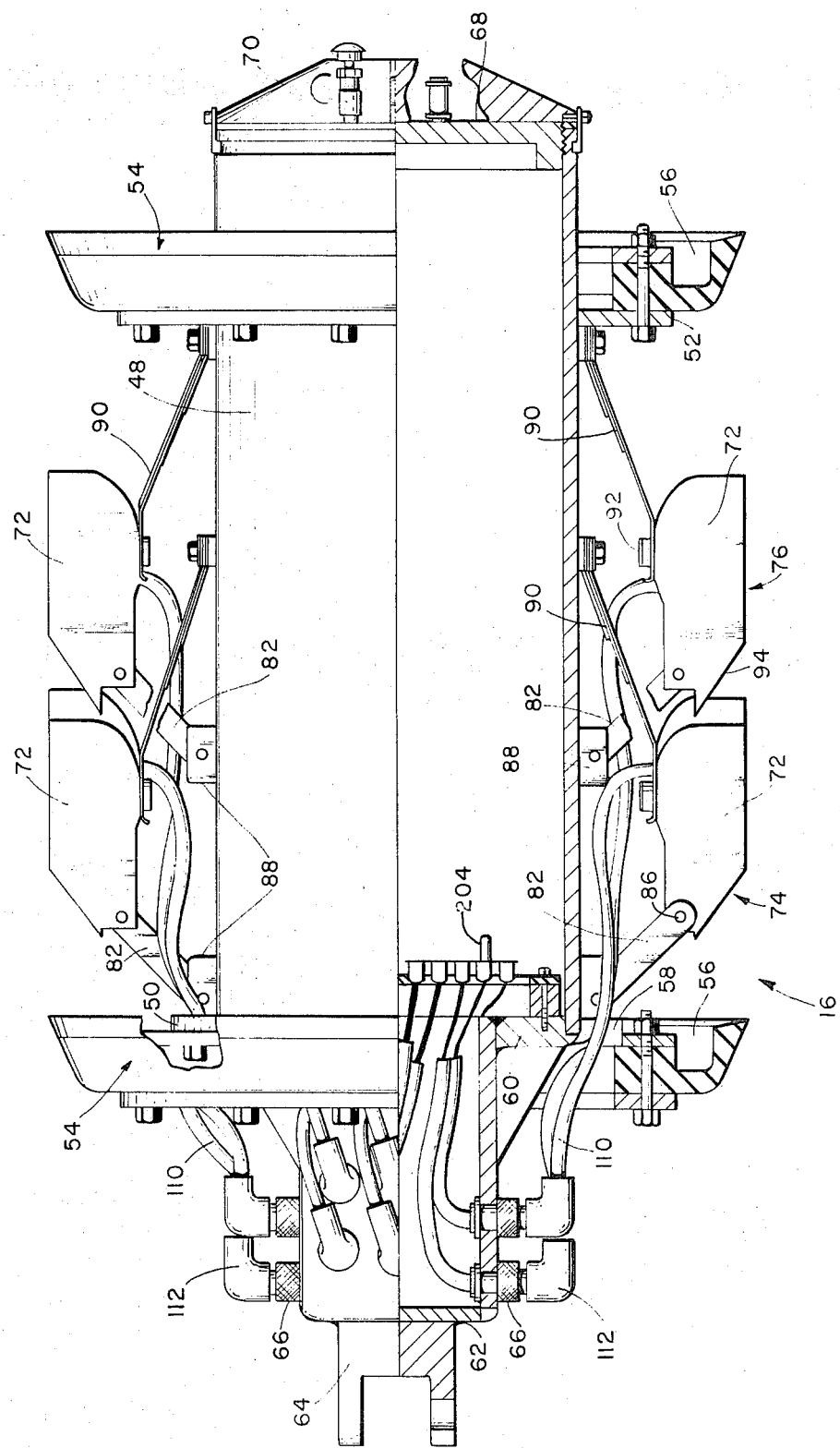
FIG. 3 is a side view of the second or trailing section of the pig, a portion thereof being broken away to show a portion of the inside thereof.

The rear or trailing section 16 (as best seen in FIG. 3) has a construction generally similar to the first section 14. More particularly, this section 16 includes a hollow body or housing 48 having a substantially cylindrical shape. A pair of radial flanges 50 and 52 are also provided on the housing 48.

A pair of seals or packers 54 are secured to the flanges 50 and 52 whereby the skirts 56 ride along the inside of the pipeline 12. Normally, the front section 14 is intended to pull the pig 10 through the pipeline 12 rather than the rear section 16 pushing the pig 10 through the pipeline 12. Accordingly, the rear packers 54 may only loosely fit the inside of the pipeline 12. However, it has been found preferable for the packers 54 to snugly fit the pipeline 12 and provide the desired degree of sealing.

Also, the packers 54 should have a relatively stiff web 55 and/or shirt 56. This will allow the packers 54 to carry the weight of the section 16 and maintain the housing 48 as close as possible to the pipeline 12. It has been found desirable for the packers 54 to carry most if not all of the weight of the section 16 and to keep it concentric with the pipeline. This relieves the shoes 72 from carrying the weight and allows them to freely and independently follow the surface of the pipe.

Vents 58 may be provided in the packers and/or in their mounting. This prevents a large paressure differential developing across the rear packers 54 whereby the fluid cannot push the rear section 16 against the forward section 14.

The opposite ends of the housing 48 are preferably closed by a pair of plates 60 and 68. The forward plate 60 is preferably at least semi-permanently secured to the housing 48. A hollow extension 62 on this plate 60 projects forwardly toward the front section 14. A fitting such as a shackle 64 is connected to the coupling 38 by a pin. This forms the universal joint 18 whereby the two sections 14 and 16 can flex relative to each other. However, they cannot rotate relative to each other.

The hollow extension 62 includes several terminals or connectors 66. The inner ends of the connectors 66 are connected by wires to various electrical components inside the housing 48 and in particular to the system shown in FIG. 5. The outer ends of the connectors 66 have cables 46 and 68 connected thereto. Cables 46 lead to the forward connectors 44 in the front section 14.

The rear plate 68 is preferably readily removable from the housing 48. This permits easy access into the housing 48 for servicing, etc. A pressure control valve 70 may be provided for regulating the internal pressure similar to the valve 42 on the front section 14.

The rear section 16 normally acts as an instrument package for inspecting the interior of the pipeline 12 for defects and storing the results of the inspection for subsequent interpretations.

In order to inspect the interior surface of the pipeline 12 one or more detector shoes 72 are provided on the outside of the second section 16. Each of the shoes 72 includes a face for scanning along the inside surface. Also each shoe 72 is resiliently mounted on the housing 48 whereby the face of the shoe 72 is normally maintained in intimate contact with the surface or at least as close as possible thereto.

The exact nature of the detector shoes 72 and the associated detection system are, of course, dependent upon a wide variety of factors such as the types of defects, etc., which are to be detected by the pig 10. For example, the shoes and inspection system may be of the ultrasonic, eddy current, etc., variety. However, in the present instance the detector shoes 72 and the system are primarily of the so-called magnetic leakage or stray field variety.

In a system of this nature the pipeline 12 is magnetized by circulating a magnetic field through the pipeline 12. If the ferromagnetic characteristics of the wall of the pipe are uniform, the distribution of the magnetic field will be substantially homogeneous throughout the wall of the pipe. As a consequence, little or no flux will extend above the inside surface of the pipeline.

However, if there is a discontinuity in the wall of the pipe, there will be a corresponding pertubation in the magnetic field. This in turn results in some of the flux field (i.e., a stray field) extending above the surface of the pipeline 12. For example, if the thickness of the wall is reduced by corrosion, there is a crack in the wall, etc., a flux field will emerge from the inside surface of the wall in the region of the discontinuity. The magnitude or flux density, the distribution and gradient of this stray field, etc., are all functions of the size and nature or the characteristics of the defect. Accordingly, by properly measuring the field it is possible to not only locate a defect but determine its type, etc.

Although it is possible to use a limited number of detector shoes, in the present instance there are two separate arrays 74 and 76 of detector shoes 72. The two arrays 74 and 76 are mounted on the exterior of the second section 16 at two axially spaced locations. The shoes 72 in each array 74 and 76 extend circumferentially around the section 16 whereby the shoes 72 are in two separate planes normal to the axis of the pipeline 12. It should be noted that if desired the shoes 72 in the two arrays 74 and 76 (or even the shoes within the same array) may be of different varieties for detecting different varieties of defects. However, in the present instance all of the shoes 72 are substantially identical to each other except they are of either the "right-hand" variety or the "left-hand" variety. This is effective to reduce rotation of the pig as it travels through the pipe.

Figure 4:
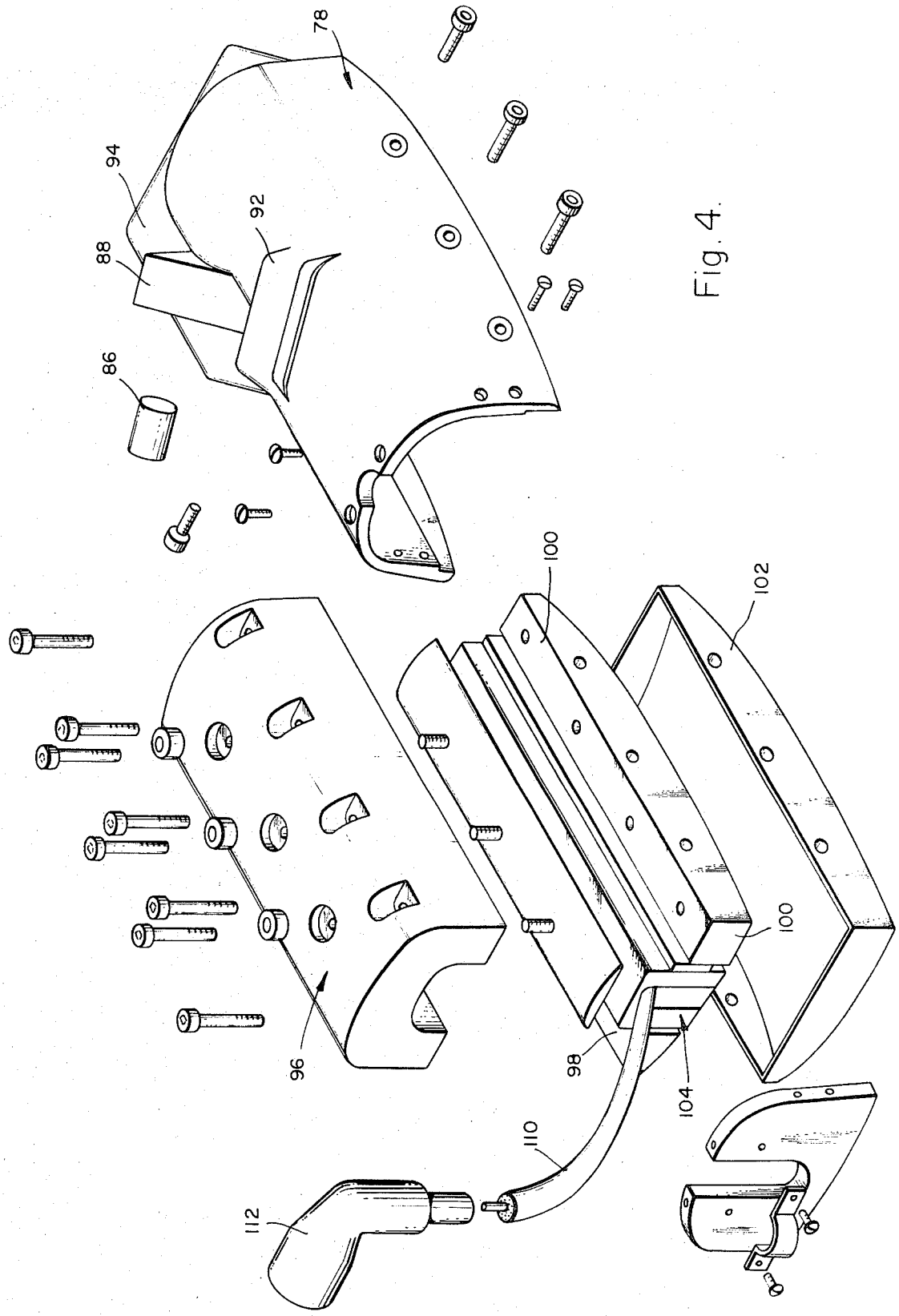
FIG. 4 is an exploded view of one of the detection shoes carried by the pig for scanning the inside of the pipelines.

As best seen in FIGS. 3 and 4 each shoe 72 includes a housing 78 which encloses and protects the contents of the shoe. It has been found that the shoes 72 must withstand a considerable amount of abuse. For example, they are frequently subjected to severe impact from colliding with various obstructions on the surface of the pipeline 12. Accordingly, it is desirable for this housing 78 to be very strong and rugged whereby it can withstand the abuse.

Each of the housings 78 is a generally U-shaped channel which opens radially outwardly toward the surface of the pipeline 12. The back of each housing 78 includes fastening means such as a projection or ear 80. Two links 82 are disposed on the opposite sides of the ear 80 and pivotally secured thereto by a bolt 86. The opposite ends of the two links 82 are in turn pivotally secured to a similar ear 88 on the exterior of the housing 78.

A spring 90 may be provided for resiliently biasing the shoe 72 outwardly. In the present instance the spring 90 is a cantilever having one end thereof rigidly bolted to the exterior of the housing 78. The opposite end extends into a slot through a second lug 92 on the outside of the housing 78.

It will be seen from FIG. 4 that by this arrangement the shoe 72 is in effect "towed" along the surface of the pipeline 12. The spring 90 is effective to resiliently bias the shoe 72 outwardly into intimate sliding contact with the surface. However, each of the shoes 72 is free to pitch about the axis of the bolt 86 and to move in and out if it collides with any irregularities in the surface.

It has been found desirable to provide a tapered guide 94 similar to a plow on the front of each shoe 72. This guide 94 slides along the surface of the pipe without interfering with the normal scanning of the shoe 72. However, in the event there is an obstruction this guide 94 will tend to ride up and over the obstruction. This is effective to prevent a shoe 72 impacting directly against tthe obstruction whereby it is torn loose or caught in the obstruction whereby the pig 10 becomes lodged in the pipeline 12.

The wall of the pipeline 12 may be magnetized by any suitable means. However, if an electromagnet is employed, this consumes substantial quantities of power. This presents problems where the pig 10 is to travel long distances. It has therefore been found preferable to utilize a permanent magnet.

Although a single large magnet may be employed, it has been found advantageous to use a plurality of separate magnets. This tends to reduce the overall size and weight. At the same time the use of a large number of individual magnets provides a greater flexibility over the control of the field within the wall.

In the present instance a permanent magnet 96 is provided in each shoe 72. The details of the inspection shoe 72 are best seen in FIG. 4. The magnet 96 is an elongated horseshoe magnet which extends the entire length of the housing 78. A pair of pole pieces 98 and 100 are bolted onto the faces of the magnet 96 and the housing 78. The two pole faces 98 and 100 have the outsides thereof contoured to form faces which fit the inside of the pipe 12.

When the shoe 72 is against the inside of the pipe wall, the two pole pieces 98 and 100 will concentrate the lines of flux in the wall.

The lines of flux normally extend along or in the portion of the wall bridging the space or air gap formed between the two pole pieces 98 and 100. If this portion of the wall is of uniform thickness and free from defects, the flux will remain inside the wall. If not, some of the flux will emerge from the wall.

It has been found desirable to provide a protective wear plate 102 on the face of the shoe 72. This plate 102 is secured to the housing 78 so as to extend over the pole pieces 98 and 100 and slide along the surface. The plate 102 is normally of a mon-magnetic material such as stainless steel, etc. This will eliminate interference with the flux distribution in the wall of the pipe. The wear plate 102 is preferably easily replaced whereby it can be frequently removed and replaced with a new one.

A probe assembly 104 is provided in the shoe 72 in order to sense any stray fields which may be produced by the magnet 96. In the present instance the probe assembly 104 is an elongated assembly disposed inside of the horseshoe magnet 96 and between the pole pieces 98 and 100.

In order to provide a high degree of resolution, a plurality of individual probes 106 is positioned in the probe assembly 104 so as to be individually responsive to stray fields just in the immediate vicinity of the probe. The probe assembly 104 is constructed and arranged such that the individual probes 106 are in intimate contact with the inside of the wear plate 102.

Any type of pickup probe may be utilized for sensing the stray field. By way of example, probes similar to those disclosed and claimed in co-pending application A-743 may be used. These are so-called "fluxgate" probes. The signal from such a probe is an AC or pulsating signal having a magnitude which is a function of the flux density. The magnitude of the signal is independent of the rate of motion through the flux field. However, the present probes are coils which generate a signal as a result of their movement through the stray flux field. If there is no motion of the probe along the pipe, there is no signal. As the shoe 72 travels along the surface of the pipeline 12 and across a discontinuity such as an irregularity or defect, the individual probes 106 in the assembly 104 will pass through the respective portions of the stray field. Each of the probes 106 then produces an individual signal corresponding to the magnitude, direction, gradient, etc., of the stray field and the rate at which it is traversed by the probe.

If the lines of magnetic flux are at right angles to a defect such as a crack, a portion of the lines of flux will extend out of the wall of the pipe, across the surface and return into the wall on the opposite side of the defect. However, if the lines of flux are parallel or nearly parallel to a defect such as a crack, very little if any stray field will emerge above the surface. Accordingly, it is extremely difficult, if not impossible, to detect even a large crack which is parallel to the magnetizing field.

It will thus be seen that if the magnetizing field extends circumferentially around the pipe, it will be possible to readily detect longitudinal cracks. However, it will be extremely difficult to detect circumferential cracks. Conversely, if the magnetizing field extends longitudinally of the pipe, it will be possible to readily detect circumferential cracks. However, it will be extremely difficult to detect longitudinal cracks. These two types of cracks, i.e., circumferential and longitudinal, are the most common types of cracks in a pipeline of this nature.

In order to overcome the foregoing difficulties and to insure a proper detection of both longitudinal and circumferential cracks, the shoes 73 in one array, for example the first array 74, are set obliquely to the direction of travel. More particularly the permanent magnets 96 are arranged such that the lines of flux will be at an angle such as +45° to the direction of travel. The shoes 72 in the other array 76 are set at right angles to those in the first array 74. The magnets 96 in the second array 76 are thus arranged such that the magnetizing lines of flux are at a −45° to the line of travel and at right angles to the magnetizing forces in the first array 74.

By arranging the shoes 72 in the first and second arrays 74 and 76 so that there are two sets of fields at right angles to each other, both longitudinal and circumferential cracks will produce stray fields. Moreover, the individual probes 106 in both arrays 74 and 76 of shoes 72 will be sensitive to both longitudinally and circumferentially oriented defects.

If each of the shoes 72 in the second array 76 is arranged to scan the same area as the corresponding shoe 72 in the first array 74, whenever the pig 10 travels over a discontinuity such as a defect, whether it is circumferential or longitudinal, both sets of individual probes 106 will produce a signal. On rare occasions there may be a spiral crack which is neither in a circumferential or longitudinal direction. If the crack is at 45° it may be generally parallel to the magnetizing forces in one array and accordingly not sensed by any of the probes in that array. However, it will inherently be at right angles to the magnetizing forces in the other array whereby it will be readily sensed by the probes in the second array.

As indicated above each individual probe 106 produces an individual signal corresponding to the increment of the stray field through which the probes passes. In order to preserve a high degree of resolution, it is preferable for each probe to be connected to a separate individual wire. All of the indivudual wires 108 for the individual probes 106 in one shoe 72 may then be bundled into a cable 110. The end of the cable 110 is equipped with a connector 112 which is adapted to be plugged into the connectors 66 and on the extension 62 on the end plate 60.

Figure 5:
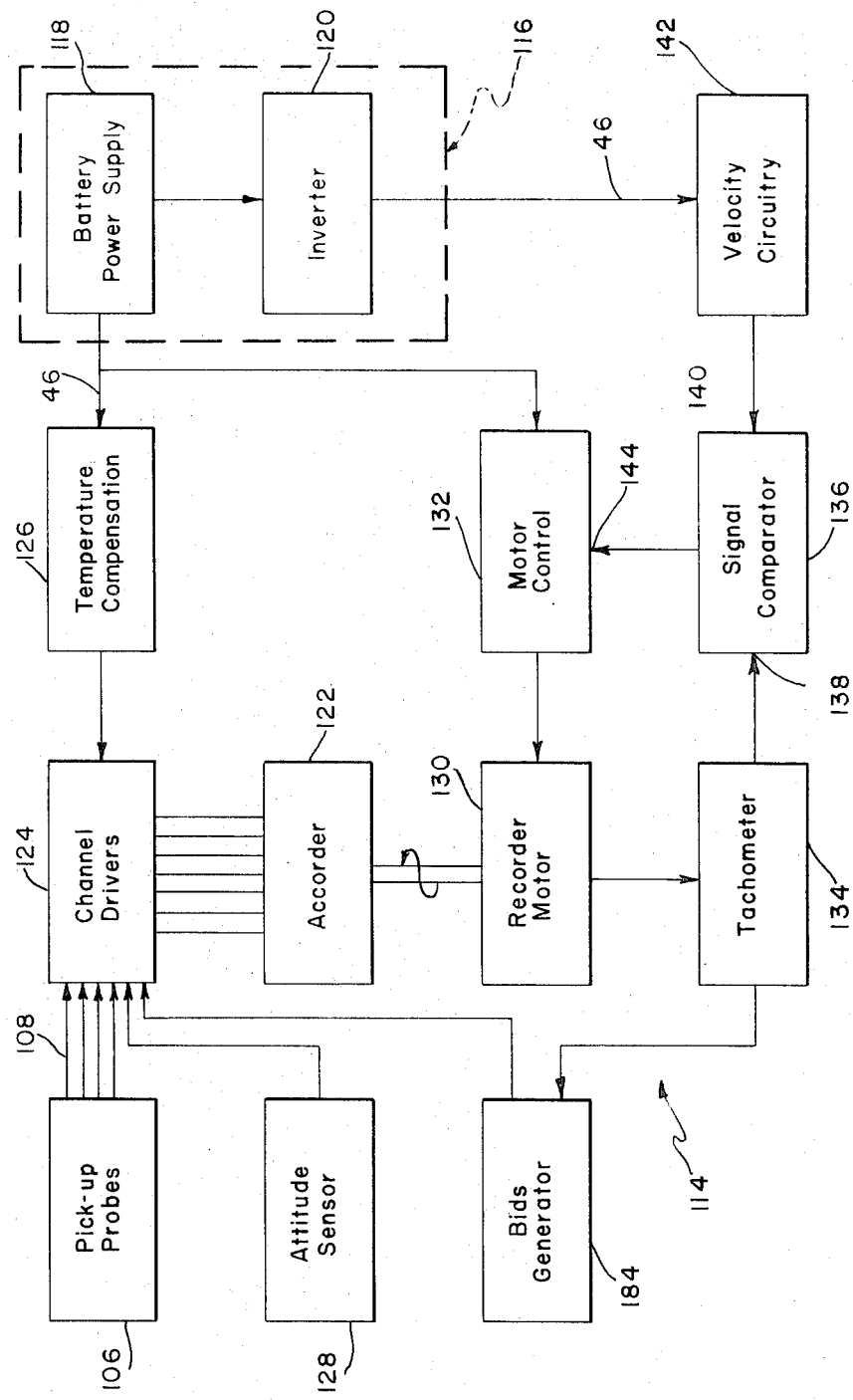
FIG. 5 is a block diagram of the inspection system embodied in the pig.

The various connectors 66 on the extension 62 are in turn connected to an inspection system 114 such as that shown in FIG. 5. This entire system 114 is operated from the power supply 116 contained in the front section 14. The power supply 116 includes a battery pack 118 which provides direct current and in inverter 120 which is connected to the battery 118 for providing an alternating current or a unipolar pulsed current. The rest of the system 114 including recorder 122 is contained in the rear section 16.

A multi-channel recorder 122 is provided for separately recording all of the individual signals produced by the individual pickup probes 106. It has been found that some types of probes produce a signal of adequate strength for being directly recorded by the recorder 122. However, in the present embodiment each of the probes 106 is shown as being coupled to one channel of the recorder 122 by a multi-channel driver 124. This driver 124 is essentially a plurality of amplifiers, one for each probe 106 and channel in the recorder 122. They are effective to increase the strength of the signals from the individual probes 106 to more useful levels, to match the output impedance of the individual probe 106 to the input impedance of the channel in the recorder 122 and/or to reduce loading of the probe 106 by the recorder 122.

It has been found that the temperature of the fluid in the pipeline 12 varies over a considerable range. For example, immediately downstream from a pumping station the temperature is normally fairly high. As the fluid travels along the pipeline 12 the heat is dissipated and the temperature reduced. In many instances the range of temperature is so large that it affects the characteristics of the system 114. In order to preserve the linearity of the system 114, it has been found desirable to provide a temperature compensator 126. The compensation 126 includes a temperature-responsive device such as a thermistor. This is effective to vary the gain of the channel driver 124 to maintain the linearity of the system 114.

Although the recorder 122 may be of any type it has been found advantageous to use a recorder such as that disclosed and claimed in co-pending application A-752. This recorder 122 is of a photo-optical variety wherein the various data signals are recorded upon a photographic film within the recorder 122.

The recorder 122 is disposed within a cylindrical housing 190 that is adapted to just fit within the second section 16. The housing 190 includes a main-frame 192 that fits inside of the semi-cylindrical bottom 194 of the housing 190. A semi-cylindrical top or cover 196 is adapted to fit onto the bottom 194 and seal the main-frame 192 inside. A latch 198 on the outer end of the housing 190 secures the bottom 194 and the cover 196 in position.

The inner end 200 of the housing 190 includes a plurality of contacts or plug sockets 202. These are adapted to mate with and fit into a plurality of contacts 204 on the inner bulk-head 60. The plug sockets 202 are connected to the various circuits, etc., of the system contained inside of the compartment 206 on the main-frame 192.

A light-tight cassette 208 is also provided upon the main-frame 192. This cassette 208 is adapted to be easily removed from the main-frame 192 or mounted thereon. The cassette 208 includes various portions of the recorder 122 such as the supply reel for the film, the take-up reel for the film, a film transport or drive mechanism for advancing the film from the supply reel across an exposure to the take-up reel.

Means are provided in the exposure area for projecting light onto the film. Each of these means is adapted to project a bright beam of light whereby a plurality of separate tracks are photographically recorded upon the film. In the present instance this means includes an array of light-emitting diodes.

The array of light-emitting diodes (one diode for each channel) is physically located adjacent the film. The individual diodes are separately driven from the channels in the driver 124. As a consequence, the intensity of the light emitted from the individual diodes corresponds to the individual magnitude of the stray field in which the corresponding individual probe 106 is disposed. It may thus be seen a large number of data channels is photographically recorded on the film. The intensity or density of the recording is a function of the stray fields along the surface of the pipeline 12.

It has been found as the pig 10 travels axially along the pipeline 12 it occasionally rolls about its axis. It is extremely difficult to keep the pig 10 in a given vertical orientation. It has also been found if the pig 10 remains in a given orientation for an extended period of time the packers 26 and 54 may tend to wear unevenly and/or other assymetric characteristics may develop. To avoid this one or more wheels may be provided for rolling along the pipe. The wheel is set at an oblique angle whereby the pig 10 will turn one complete revolution as the pig travels some distance such as 500 feet.

It will be seen if the pig 10 is rolling about its axis at any given instant any one of the shoes 72 may be at the top of the pig 10 and scanning the top of the pipeline 12. Accordingly, the channel which is recorded on the film corresponding to the top of the pipeline 12 may be positioned at any lateral point upon the film.

When analyzing and interpreting the inspection results recorded on the film, it is highly desirable to know which of the recorded channels corresponds to the top of the pipeline 12. In the present embodiment this is accomplished by recording the attitude or angular orientation of the the pig 10 on the film along with the other data.

For this purpose an attitude sensor 128 is provided. This includes a device such as a pendulum mounted inside of the pig 10 so as to always hang in a vertical position. A potentiometer is connected to the pendulum. As the pig 10 rotates about its axis the potentiometer will rotate therewith while the pendulum remains vertical. This will cause the adjustment of the potentiometer to vary as a function of the roll whereby a corresponding signal is produced.

This signal will normally vary from some level such as 0 volts for one position on up to some other level such as approximately 5 volts as it is rolling through 360°. Thus, any given level of the signal will be an unambiguous indication of the amount of roll.

In the event there is a hazardous condition in the pipeline 12, it will be recorded upon the film. From this recording the operator can determine whether the hazardous part of the pipeline 12 should be replaced. Since the pipeline 12 is buried and relatively inaccessible, it is essential that the operator be able to determine from the recorded film the precise location of the hazardous area.

The film transport for advancing the film through the recorder 122 is driven by motor 130. The speed at which the film is advanced through the film transport may be constant if so desired.

However, the speed of the pig 10 through the pipeline 12 is not constant. Accordingly, if there is a constant film speed, the longitudinal position of a recording on the film will not be an accurate indication of the position of the pig 10 along the pipeline 12 when the recording occurred.

To avoid this difficulty it has been found advantageous for the speed of the motor 130 to be correlated as precisely ad possible with the speed of the pig 10 through the pipeline 12. This will make distance along the film a function of distance along the pipeline.

In the present instance this is accomplished by employing a variable speed motor 130 together with a speed control 132. The speed control 132 is effective to run the motor 130 as a function of the pig speed. Accordingly, the distance along the film is a function of the distance along the pipeline 12.

A tachometer 134 is coupled to the recorder motor 130 and produces a speed signal. The magnitude of this signal is a function of the speed at which the film is traveling through the recorder 122. The tachometer 134 is in turn connected to one side 138 of a signal comparator 136. The opposite side 140 of the signal comparator is coupled to a velocity circuitry 142. This circuitry 142 produces a speed signal which is precisely correlated with the speed of the pig 10 through the pipeline 12.

The signal comparator 136 is effective to compare the speed signal from the velocity circuitry 142 (i.e., the speed of the pig 10) with the speed signal from the tachometer 134 (i.e., the speed of the film) and produce an error or difference signal. The magnitude of the error signal corresponds to the error in the film speed.

The output of the signal comparator 136 is coupled to the input of the motor control 132. This error signal on the input 144 is effective to cause the motor control 132 to vary the speed at which the recording motor 130 is running. This is continually varied so as to maintain the signal from the tachometer 134 identical to the signal from the velocity circuitry 142.

It will be seen this forms a closed-loop speed control system and insures the film being driven through the recorder 130 at a speed which is a precise function of the speed of the pig. As a consequence, the displacement along the length of the recorded film will be a precise scale function of the distance along the pipeline 12. Accordingly, if there is a hazardous condition in the pipeline 12 and this is recorded on the film, the operator can very precisely determine the location of the condition along the pipeline 12 by merely scaling the distance along the film.

Figure 6:
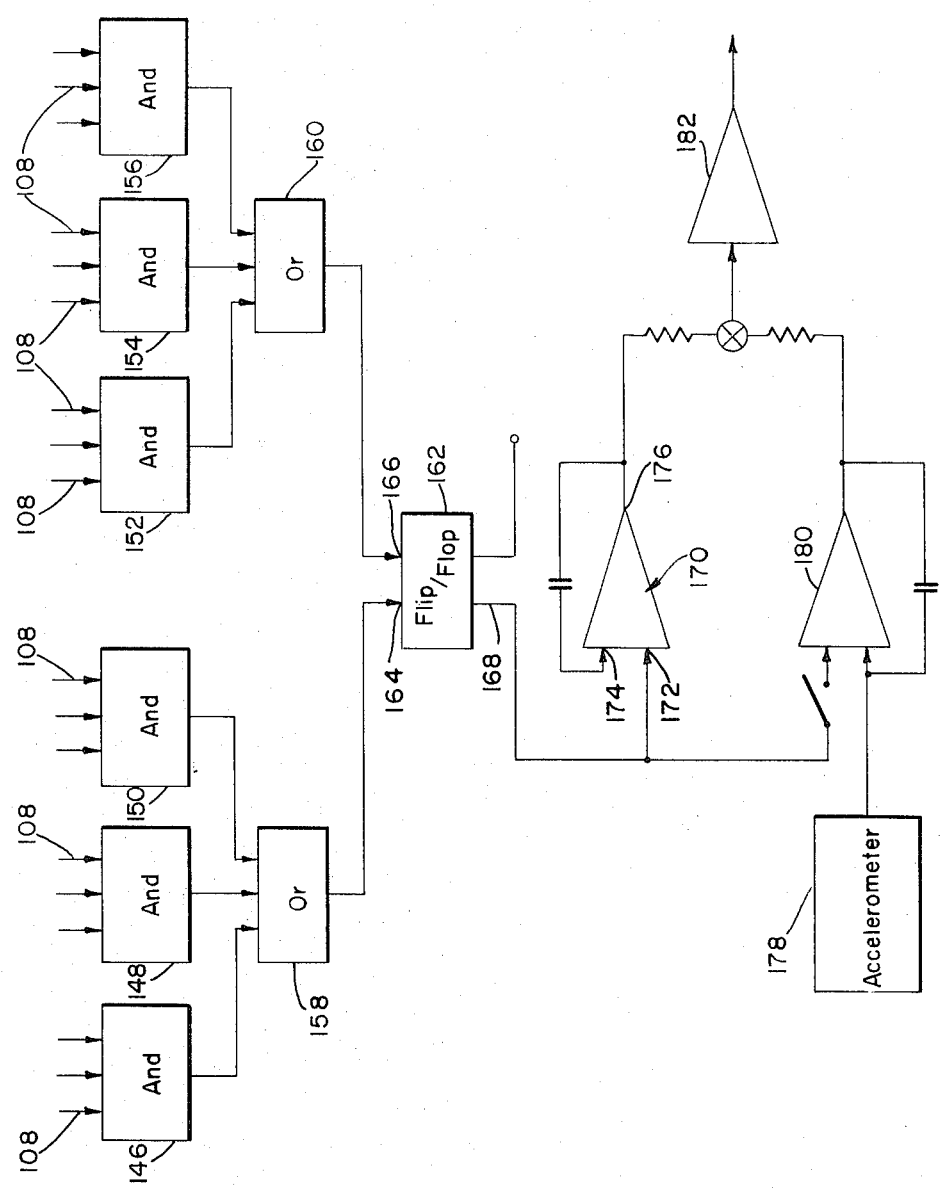
FIG. 6 is a block diagram of a portion of the inspection system of FIG. 5.

Any type of speed circuitry may be used for generating a speed signal. However, it has been found that devices such as a wheel rolling along the inside of the pipeline 12 tends to skid, bounce, etc. As a consequence, such an arrangement produces somewhat inaccurate speed signals. This in turn impairs the accuracy of the correlation between the position on the film and along the pipeline. Accordingly, it has been found desirable to employ a velocity circuitry 142 such as that shown in FIG. 6.

As indicated above a pipeline 12 is fabricated from individual sections of pipe welded end-to-end. Accordingly, the pipeline includes a large number of circumferential or girth welds. The lengths of pipe are not precisely uniform or standardized, particularly between different pipelines. Also, it is common to use short lengths or scraps of left-over pipe. Accordingly, although the girth welds are normally spaced at fairly regular intervals of about 30 to 40 feet, the precise distance between the girth welds varies over a considerable range with the variations being irregular and unpredictable. As a result it has been found tha the position along a pipeline cannot be determined by merely counting the number of girth welds, etc.

The distance between the two annular arrays 74 and 76 of shoes 72 is a fixed, known amount. Accordingly, the time delay required for a weld to pass from the first array 74 to the second array 76 will always be a precise function of the speed at which the pig 10 is moving past the weld.

Since the girth weld extends completely around the entire circumference, it is to be expected that each and every individual probe 106 will produce a pulse when the pig 10 travels past a weld. This, of course, is a very unique event and will not occur at any other time.

It will thus be seen that ideally each and every individual pickup probe 106 in the first array 74 will simultaneously produce a pulse when the first array 74 passes the girth weld. After the lapse of some time interval each and every pickup probe 106 in the second array 76 will simultanously produce a pulse when the second array 76 passes the girth weld. The delay between these two pulses is the time required for the pig 10 to travel a distance equal to the space between the two arrays 74 and 76.

As a practical matter, it has been found that one or more of the individual probes 106 may not produce a pulse. For example, a shoe 72 may temporarily disengage the pipe whereby the probes therein are not effectively coupled to the pipe, one or more of the probes 106 may be inoperative and/or some portions of a weld may be of such a nature that a probe 106 passing over that portion will not produce a significant signal. As a result, in actual practice it is not uncommon for a signal to be lacking in at least some of the individual probes 106 when passing a girth weld.

Accordingly, it has been found desirable to subdivide the individual probes 106 in each array 74 and 76 into several separate sets. For example, each array of probes may be subdivided into 3 or 4 sets. The probes 106 in each set are sufficient in number and scattered around the circumference to present a very low probability of a signal occurring simultaneously in all of the probes 106 unless they are actually passing over a girth weld. Also, the number of probes 106 in a set is sufficiently small to insure an extremely high probability of a signal occurring in each individual probe 106 within the set when they pass over a girth weld. With such an arrangement it is virtually a certainty that all of the probes 106 in at least one set in each array 74 and 76 will produce a pulse each time the pig 10 passes a girth weld.

All of the individual probes 106 in each set are coupled to an AND gate. When, and only when, all of the individual probes 106 in the set simultaneously produce a signal will there be an output signal from the associated AND gate.

As indicated above there is a possibility that some of the probes 106 in one or more of the sets may fail to produce a signal when a girth weld is traversed. In this event there will not be a signal from the associated AND gate or gates. However, it is a virtual certainty that at least one AND gate 146, 148 or 150 in the front array 74 and at least one AND gate 152, 154 or 156 in the rear array 76, respectively, will produce a signal.

All of the AND gates 146, 148 and 150 for the first array 74 of shoes 72 are coupled to a first OR gate 150 while all of the AND gates 152, 154 and 156 for the second array 76 of shoes 72 are coupled to a second OR gate 160. These two OR gates 158 and 160 are effective, respectively, to produce a first signal representing the time the first array 74 passes the girth weld and a second signal representing the time the second array 76 passes the girth weld.

The two OR gates 158 and 160 are coupled to means for producing a signal having a magnitude which is a function of the length of time between the two pulses from the OR gates 158 and 160. In the present instance this includes a flip-flop 162. The first or set input 164 is coupled to the first OR gate 158 while the second or reset input 166 is coupled to the second OR gate 160. This will cause the flip-flop 162 to set when the shoes 72 in the first array 74 pass over a girth weld, and to reset when the shoes 74 in the second array 76 pass over the weld. The signal from the output 168 of the flip-flop 162 will be a square wave having a time duration equal to the time required for the pig 10 to travel a distance equal to the space between the first array 74 of shoes and the second array 76 of shoes.

The output of the flip-flop 162 is in turn coupled to means responsive to the time duration of the square wave to porduce a speed signal. The magnitude of this speed signal will be a function of the duration of the square wave and therefore the velocity of the pig 10.

In the present instance this includes an operational amplifier or integrator 170. One input 172 of the amplifier 170 is connected to the output 168 of the flip-flop 162 while the other input 174 is connected to the output 176 of the amplifier 170. As a consequence, when a square wave is applied to the input 172 the signal on the output 176 will rise at a predetermined rate for the duration of the square wave.

When the square wave terminates the integrating process will terminate and the level of the signal on the output 176 will no longer increase. As a consequence, the signal on the output 176 will remain at a fixed level representing the speed of the pig 10. The signal will persist until such time as the next succeeding square wave commences, i.e., the pig 10 passes over another girth weld. At that time the output 176 will be discharged back to zero and progressively increased corresponding to the time duration of the square wave.

It can thus be seen that as the pig 10 travels down the pipeline 12 every time it passes over a girth weld this speed signal will be revised or updated to correspond to the velocity of the pig 10 past the weld.

Since the pumping rate and the velocity of the fluid through the pipeline 12 are substantially constant, it is reasonable to assume that on the average the velocity of the pig 10 will be substantially constant from one weld to the next. Although this is not entirely true, for most purposes it provides a sufficiently accurate correlation between the position of the film and in the pipeline 12.

It has been found that as a practical matter in some parts of the pipeline there may be substantial variations in the velocity of the pig between the girth welds. For example, if there are pipe sections crushed out of round or any other form of restriction or obstruction, the pig 10 may be intermittently slowed down or even stopped for a significant period of time while traveling between girth welds. Time delay means may be provided for sensing the interval between the updating of the speed signal. If the interval exceeds some preselected amount such as 30 to 45 seconds, the drive motor 130 is stopped until the pig starts to move again. This prevents excessive amounts of film being consumed while the pig is static.

In order to continually update the speed signal an accelerometer 178 may be provided in the pig 10. This accelerometer 178 is aligned with the axis of the pig 10 so as to be responsive to the changes in the velocity in the direction of the axis of the pig 10. The signal from the accelerometer will therefore be a function of the changes in velocity.

The putput of the accelerometer 178 is coupled to the input of an integrator amplifier 180 or similar device connected in parallel to the first integrator amplifier 170. This is effective to continually add the acceleration signal to the velocity signal whereby the velocity will always be an exact function of the pig velocity. The velocity signal is coupled to the input of an output amplifier 182.

It will thus be seen that a very accurate and continually varying speed signal is provided to the input of the comparator 136. As a consequence, the recording speed of the film is continually varied. This in turn insures that the distance along the recorded film is precisely related to the distance of the pig 10 along the pipeline 12. Thus if it is desired to know the location of a particular defect in the pipe, this can be determined by measuring the distance along the film.

If the light from a diode remains constant as the speed of the film varies, the exposure will tend to vary. It will thus be seen that the exposure is a function of speed. In the present instance the signals from the probes 106 are functions of the speed of the pig 10 through the pipeline. By a careful balancing of the respective parameters it is possible to balance these factors against each other whereby the recording on the film is independent of the speed and entirely a function of the size of the discontinuity.

However, if this balancing out of the effects of speed cannot be accomplished, it may be desirable to compensate for this effect and to insure a linear recording. This may be accomplished by a bias generator 184. This generator 184 is coupled to the tachometer 134 so as to be responsive to the recording speed signal. The generator 184 in turn provides a gain control signal for the channel driver 124. This is effective to vary the gain of the driver 124 and maintain a linear recording.

It will be seen that the individual signals from each of the probes 106 are separately recorded. As a result the interrelationship of the signals can be preserved. As pointed out above there are two magnetic fields at right angles to each other whereby a crack of any orientation will be detected. Moreover, by comparing the interrelationship of the signals from the different probes 100 but resulting from a common discontinuity, it is possible to determine considerable information as to the nature and orientation of the discontinuity.

If a discontinuity is present on the surface being scanned by the probes 106, the resultant stray field will be of considerably greater magnitude and/or gradient. Conversely, if the discontinuity is on a remote surface the field will be of lesser amplitude and gradient for the same size discontinuity. Accordingly, by comparing the gradient (i.e., rate of change), duration, amplitude, etc., of a signal relative to the signals from the probes 106 in the same array 74 or 76 and relative to signals from the probes in the different arrays 74 and 76, it is possible to determine the nature, size, location, etc., of the discontinuity.

We claim:

1. A pipeline inspection apparatus for traveling through a pipeline including the combination of a first array of pickups, said array having permanent magnetic means therein effective to create a magnetic field in the wall of the pipeline spirally disposed relative to the axis of the pipeline, each of said pickups in said array being aligned with said field and effective to individually scan a preselected segment of the inside surface of the pipeline and produce an individual signal corresponding to certain preselected characteristics of said segment, a second array of pickups, said second array having permanent magnetic means therein effective to create a magnetic field in said wall at substantially right angles to the first field, each of said pickups in said second array being effective to individually scan a preselected segment of the inside surface of the pipeline and produce an individual signal corresponding to certain preselected characteristics of said segments, the individual pickups in the second array being substantially aligned with the respective individual pickups in the first array whereby the respective pickups in the two arrays scan the same segment and the individual signals produced by the respective pickups correspond to the characteristics of said segment, and means coupled to said pickups and responsive to the individual signals therefrom to produce a signal corresponding to the characteristics of the pipeline.

2. A pipeline inspection apparatus for traveling through a pipeline including the combination of first means effective to produce a first magnetic field in the wall of said pipeline, said field extending in a first direction and producing stray flux fields adjacent the surface of the pipeline, a first array of pickups effective to scan said surface and produce first signals corresponding to said stray fields, second means effective to produce a second magnetic field in the wall of said pipeline, said second field extending in a second direction and producing stray fields adjacent the surface of the pipeline, a second array of pickups effective to scan said surface and produce second signals corresponding to said second stray fields, third means coupled to the pickups in the first and second arrays and responsive to the first and second signals, said third means being effective to produce a signal corresponding to said first and second signals, and fourth means coupled to said first and second means, said fourth means being responsive to the time delay between the first and second signals and effective to produce a speed signal.

3. A pipeline inspection apparatus for traveling through a pipeline including the combination of a set of detector shoes arranged in an annular array, said shoes being adapted to be positioned adjacent the inside surface of the pipeline to scan adjacent circumferential segments on the inside surface of the pipeline, a permanent magnet in each of said shoes, each of said permanent magnets having an air gap positioned to produce a magnetic flux field in the wall of the pipeline which extends oblique to the axis thereof, and a plurality of pickup probes in said shoes positioned in said air gap.

4. The combination of claim 3 including a second set of detector shoes arranged in a second annular array, the shoes in the second set being adapted to be positioned adjacent the inside surface of the pipeline to scan adjacent circumferential segments on the inside surface of the pipeline, a permanent magnet in each of the shoes in said second set, each of said second permanent magnets having an air gap positioned to produce a magnetic flux field in the wall of the pipeline at substantially right angles to the first flux field, and a plurality of pickup probes in said second shoes positioned in said air gap.

5. The combination of claim 4 including means coupled to the pickups in said shoes and effective to produce signals corresponding to the characteristics of the wall of said pipeline.

6. A pipeline inspection apparatus for traveling through a pipeline including the combination of a plurality of pickups arranged to scan adjacent segments of the pipeline and generate signals corresponding to the characteristics of the wall being scanned by the pickups, means effective to produce a speed signal corresponding to the speed at which said pickups are scanning the segments, a multi-channel recorder, each of said channels being coupled to a separate one of said pickups for separately recording each of said signals, a drive coupled to said recorder, said drive being effective to produce a tachometer signal, and a speed control coupled to said drive and to said means, said speed control being effective to vary the drive to maintain the tachometer signal and the speed signal equal.

7. A pipeline inspection apparatus for traveling through a pipeline including the combination of detector means for scanning the inside surface of the pipeline and producing a first signal corresponding to the characteristics of the wall of the pipeline, and second means coupled to the detector means and responsive to said first signal, said second means being effective to produce a second signal which is a function of the speed at which said detector means is scanning said surface.

8. The combination of claim 7 including an accelerometer responsive to the changes in the speed of said apparatus to produce an acceleration signal, and third means coupled to said second means and to said accelerometer and responsive to the second signal and to said acceleration signal.

9. The combination of claim 7 wherein said detector means includes first and second parts, said parts being axially separated a predetermined distance whereby said first signal includes a first portion corresponding to a particular characteristics and a second portion corresponding to said particular characteristics, one of the portions of said signal being delayed from the other portion by an interval corresponding to the time required for the inspection apparatus to travel a distance equal to the distance between said two parts, and said second means is responsive to the time delay between said first and second portions of said first signal to produce said second signal.

10. A pipeline inspection apparatus for traveling through a pipeline including the combination of first detector means adapted to scan the inside surface of the pipeline as said apparatus travels therethrough, said first detector means being effective to provide a first signal corresponding to the characteristics of the wall of said pipeline, second detector means adapted to scan the inside surface of the pipeline as said apparatus travels therethrough, said second detector means being effective to provide a second signal corresponding to the characteristics of the wall of said pipeline, said first and second detector means being separated a predetermined distance from each other whereby the first and second signals are displaced timewise from each other by an interval which is a function of the time required for said apparatus to travel said distance, and means coupled to said first and second detector means and responsive to the time displacement between said first and second signals.

11. A pipeline inspection apparatus for traveling through a pipeline including the combination of first detector means for scanning the inside surface of the pipeline and producing a first signal each time said apparatus passes a girth weld in the pipeline, second detector means for scanning the inside surface of the pipeline and producing a second signal each time said apparatus passes a girth weld in the pipeline, third means coupled to the first and second detector means and responsive to said first and second signals said third means being effective to produce a third signal which is a function of the time delay between the first and second signals.

12. On a pipeline inspection apparatus for traveling through a pipeline the combination of a first array of pickups, the individual pickups in said first array being circumferentially spaced around said apparatus and effective to individually scan adjacent circumferential segments on the inside surface of the pipeline and produce a first series of individual signals corresponding to the characteristics of said segments, first means coupled to the pickups in said array and effective to produce a timing signal in response to certain preselected combinations of the individual signals in said first series, a second array of pickups axially spaced from the first array, the individual pickups in said second array being circumferentially spaced around said apparatus and effective to individually scan adjacent circumferential segments on the inside surface of the pipeline and produce a second series of individual signals corresponding to the characteristics of said segments, second means coupled to the pickups in the second array and effective to produce a second timing signal in response to certain preselected combinations of the individual signals in said second series, and third means coupled to said first and second means, said third means being responsive to the time delay between said timing signals to produce a speed signal.

13. A pipeline inspection apparatus for traveling through a pipeline including the combination of a first array of pickups, the individual pickups in said array being circumferentially spaced around said apparatus and effective to individually scan adjacent circumferential segments on the inside surface of the pipeline and produce individual signals corresponding to the characteristics of said segments, first means coupled to the pickups in said array and effective to produce a timing signal in response to certain preselected combinations of said individual signals, a second array of pickups circumferentially spaced around said apparatus and axially spaced from the first array, the pickups in said second array being effective to individually scan adjacent circumferential segments on the inside surface of the pipeline and produce individual signals corresponding to the characteristics of said segments, second means coupled to the pickups in the second array and effective to produce a second timing signal in response to certain preselected combinations of said individual signals, and third means coupled to said first and second means, said third means being responsive to the time delay between said timing signals to produce a speed signal.

14. A pipeline inspection apparatus for traveling through a pipeline including the combination of an accelerometer responsive to the acceleration of the apparatus in a direction parallel to the axis of the pipeline to produce a signal corresponding to the changes in the speed of the apparatus through the pipeline, and speed signal means effective to provide a speed signal which is a function of the speed of said apparatus, said speed signal means being coupled to the accelerometer and effective to change said speed signal as a function of the acceleration signal.

15. On a pipeline inspection apparatus for traveling through a pipeline the combination of pickup means positioned to scan the inside surface of the pipeline and provide a speed signal which is a function of the speed of said apparatus through the pipeline, an accelerometer responsive to the acceleration of the apparatus in a direction parallel to the axis of the pipeline, said accelerometer being effective to produce an acceleration signal corresponding to the changes in the speed of the apparatus through the pipeline, and speed signal means coupled to said pickup means and to said accelerometer and responsive to the speed signal and to the acceleration signal.

16. A pipeline inspection apparatus for traveling through a pipeline including the combination of pickup means positoned to scan the inside surface of the pipeline s said apparatus travels through the pipeline, said pickup means being responsive to certain preselected characteristics in the wall of said pipeline and effective to intermittently produce a signal which is a function of the speed at which said apparatus passes over the characteristics, an accelerometer responsive to the acceleration of the apparatus in a direction parallel to the axis of the pipeline, said accelerometer being effective to produce an acceleration signal corresponding to the changes in the speed of the apparatus through the pipeline, speed signal means effective to provide a speed signal which is a function of the speed of said apparatus, means coupled to said speed signal means and responsive to the as produced speed signals and the acceleration signal, said last means being effective to intermittently correct said speed signal whenever said intermittent signal occurs and to vary said speed signal in accordance with the acceleration signal therebetween.

17. A pipeline inspection apparatus for traveling through a pipeline including the combination of a vehicle adapted to travel through the pipeline, a first array of detector shoes mounted on said vehicle to travel therewith, each of the shoes in said array being adapted to be positioned adjacent the inside surface of the pipeline and to scan adjacent circumferential segments on the inside of the pipeline, a permanent magnet in each of said shoes, each of said permanent magnets having an air gap positioned to produce a magnetic flux field in the wall of the extending oblique to the axis thereof, a plurality of pickup probes in each of said shoes, said pickup probes being positoned to scan stray fields resulting from the permanent magnets and to produce signals corresponding thereto, a second array of detector shoes mounted on said vehicle to travel therewith and being spaced a predetermined distance from the first array, a permanent magnet in each of the shoes in the second array, each of said permanent magnets having an air gap positioned to produce a magnetic flux field in the wall of the pipeline which extends at substantially right angles to the first field, a plurality of pickup probes in each of the shoes in the second array positioned in the respective air gaps, said pickup probes being positioned to scan the stray fields resulting from the respective permanent magnets and to produce electrical signals corresponding thereto, recording means carried upon the vehicle and coupled to the pickups for recording each of the individual signals, means responsive to the time delay between corresponding signals from the two arrays to produce a speed signal, and speed control means coupled to said last means and the recording means, said speed control means being responsive to the speed signal.

* * * * *